United States Patent [19]
Ettel et al.

[11] Patent Number: 5,839,049
[45] Date of Patent: Nov. 17, 1998

[54] METHOD FOR VARYING THE DENSITY OF PLATED FOAM

[75] Inventors: Victor A. Ettel, Mississauga; John Ambrose; Paul A. Hynek, both of Burlington; Peter J. Kalal, Mississauga; Lloyd M. Timberg, Burlington; David K. Vallbacka, Oakville, all of Canada

[73] Assignee: Inco Limited, Toronto, Canada

[21] Appl. No.: 637,298

[22] Filed: Apr. 24, 1996

[51] Int. Cl.⁶ .................................................. B22F 3/22
[52] U.S. Cl. .................................... 419/2; 427/205
[58] Field of Search ................... 427/205; 419/2

[56] References Cited

U.S. PATENT DOCUMENTS

| | | | |
|---|---|---|---|
| 4,215,190 | 7/1980 | Ferrando, et al. | 429/222 |
| 4,574,096 | 3/1986 | Ferrando | 427/126.6 |
| 4,957,543 | 9/1990 | Babjak, et al. | 148/13 |
| 5,045,349 | 9/1991 | Ferrando | 427/113 |
| 5,132,080 | 7/1992 | Pfeil | 419/2 |
| 5,300,165 | 4/1994 | Sugikawa | 427/124 |
| 5,496,650 | 3/1996 | Sugikawa | 428/548 |
| 5,508,114 | 4/1996 | Sugikawa | 428/548 |

FOREIGN PATENT DOCUMENTS

| | | |
|---|---|---|
| 0071119 | 2/1983 | European Pat. Off. . |
| 0402738 | 12/1990 | European Pat. Off. . |
| 0609180 | 8/1994 | European Pat. Off. . |
| 0657950 | 6/1995 | European Pat. Off. . |
| 55-098475 | 7/1980 | Japan . |
| 62-154570 | 7/1987 | Japan . |
| 63-114068 | 5/1988 | Japan . |

OTHER PUBLICATIONS

"SEALED BIPOLAR NI–CD BATTERIES", by G. Bronoel, N. Tassin, R. Rouget, T. Potier—1992—IEEE 35th Intl. Power Sources Symposium, pp. 279–280.

"Fabrication Of Prototype Large Scale Composite Fiber Nickel Electrodes", by W.A. Ferrando, IEEE 1992—pp. 141–144.

Primary Examiner—Ngoclan Mai
Attorney, Agent, or Firm—Edward A. Steen

[57] ABSTRACT

A process for varying the density of porous plated metal foams. Especially useful for battery plate applications, a plated foam is coated with a slurry of predetermined size metal power, particularly nickel, and then sintered. The resultant density of the metal foam may be adjusted as needed.

18 Claims, No Drawings

METHOD FOR VARYING THE DENSITY OF PLATED FOAM

TECHNICAL FIELD

The instant invention relates to metal plated polymeric foams in general, and more particularly, to a technique for selectively increasing the density of the metal plated thereon. The method has particular applicability to battery plate manufacture.

BACKGROUND ART

Due to increasing political and environmental pressures, electric vehicles ("EV's") are being championed as a means for reducing vehicle borne pollutants. The current drawback of EV's are their battery systems. Extensive research is being conducted to raise the energy density and reduce the weight of existing and promising batteries.

An EV battery must allow sufficient driving range between recharges, have low maintenance, give adequate acceleration and permit safe and rapid recharging, both when needed by the user and during regenerative braking. The cost of the battery and any replacement(s) that may be required during the life of the vehicle must also be low enough to make the non-polluting EV an attractive choice for the consumer.

For example, in 1991 an attempt to define the above criteria was made by the United States Advanced Battery Consortium (USABC):

|  | Mid Term | Long Term |
| --- | --- | --- |
| Specific Energy, Wh/kg | 80–100 | 200 |
| Specific power, W/kg | 150–200 | 400 |
| Cycle Life, 80% DOD cycles | 600 | 1000 |
| Ultimate Price, $/kWh | <$150 | <$100 |
| Recharge Time | <6 hrs | 3–6 hrs |
| Fast Recharge | 40–80% SOC in <15 min. | 40–80% SOC in <15 min. |
| Operating environment | −30 to 65° C. | −40 to 85° C. |

A better touchstone than the separate cost of kWh and cycle life criteria is the combination thereof. That is, the battery cost per distance (mile or kilometer) over the life of the vehicle. It is ultimately a long battery life coupled with low cost that will drive the economics of EV's.

Many batteries today meet or excel in some of the above criteria but fail or are marginal in others. For example, lead acid batteries excel in cost per kWh, are marginal in the cycle life criterion, and are insufficient in energy density which affects driving range.

Nickel cadmium and nickel metal hydride batteries offer fair to good energy density and other performance properties, but currently fail to meet the cost per kWh criteria because of their high manufacturing costs. Cost of primary materials is not unacceptably high. For example, the traditional design of a NiCd battery with a sintered nickel plaque positive electrode and a pasted negative electrode usually contains (per kWh of capacity) about 4.5 pounds (2 kg) of nickel in the active mass and about 5.5 pounds (2.5 kg) in the current distributing plaque. Ten pounds (4.5 kg) of nickel metal corresponds to about $40 per kWh. Eight pounds (3.7 kg) of cadmium per kWh corresponds to only $17 per kWh. Yet the price of a manufactured NiCd battery is over $500 per kWh, as compared to the price of comparable lead acid battery of only $150/kWh.

The difference between the cost of these batteries ($350/kWh) is much more than the difference in the cost of materials because it reflects the complicated, labor intensive process of making NiCd batteries incorporating sintered electrodes as compared to the simple, high speed grid production and pasting of lead acid batteries.

Similar high speed pasting of nickel batteries is possible when using nickel foam or similar substrates developed for this specific purpose and manufactured in large volume to reduce cost. Large cost savings may be realized by reducing the number of operations required in electrode manufacture and/or simplifying them.

Another expensive operation that raises the cost of NiCd batteries is attaching electrode tabs to the porous sheets by welding. This is usually done after pasting the electrode strip and cutting it into individual electrodes. To successfully weld a tab to the porous sheet, the weld area must be cleaned of active mass. Furthermore, the weld joint is a point of weakness and the unavoidable vibrations during vehicle use may result in weld break and premature electrode failure.

The tab area of the electrode is also a source of significant voltage drop, which will compromise battery performance at high rates. The entire electrode current has to pass through the limited cross-section of the weld and through the small adjacent area of the electrode structure. This area normally has the same density and conductivity as the bottom part of the electrode, which carries only a very small fraction of the total current. In other words, the nickel density of the conventional porous structure used for EV batteries is a compromise between the need for increased conductivity near the tab and the need for a low electrode weight.

SUMMARY OF THE INVENTION

Accordingly, there is provided a method for varying the conductivity of a nickel foam substrate. Especially useful for lightweight battery plates, a continuous porous strip of nickel foam or felt is produced with the nickel density varying in such a manner so as to permit the cutting out of electrodes with high conductivity and density in both the tab areas and, optionally, in the upper parts of the electrode. The higher nickel density is required because these areas in the electrode carry more current than the bottom part. The variations in the nickel density can be achieved by selectively plating more nickel in certain areas of the strip during the plating operation. Additional nickel powder is applied to selected areas of the substrate before sintering to increase the density of the nickel thereon.

PREFERRED MODE FOR CARRYING OUT THE INVENTION

It has been determined that certain nickel powders can be used to increase the nickel density (and therefore also the conductivity and strength) of porous plated structures such as foams and felts by forming a slurry with the powder and applying it to the selected areas of the porous structure at some stage before sintering.

The benefits of either first coating the raw foam with the slurry before plating using the carbonyl process described in U.S. Pat. No. 4,957,543, or, reversing the order and plating first, followed by coating with the slurry have been compared. The latter procedure seems particularly effective as the layer of nickel powder applied on top of the plated deposit seems to sinter more readily into a low porosity metal which can significantly increase strength and conductivity. Other initial plating procedures may be used to coat the substrate.

Nickel powders with a particle size of about 1 $\mu$m or less (as measured with the Fisher™ Sub-Sizer) and an apparent density of about 1 g/cc or more have been found to be very effective for this application. Such powders, which are now produced by assignee under the designation Inco® Type 110™ nickel powders, when dispersed in a suitable slurry, result in a relatively dense overcoating of the substrate after drying. After sintering under conditions required to eliminate the organic substrate and to soften the deposit, such an overcoat becomes a sufficiently dense layer of metal. Modifications to the slurry density or the application procedure can be used to vary the amount of additional metal such that the density and conductivity are highest at the tabs area and gradually decrease further away.

This method can also be used to prepare electrode structures with the required density of nickel when starting from thinly-plated, low-density structures (e.g. 100–300 g Ni/m$^2$) which can be produced more quickly and economically than plated structures with the usual densities of 500–900 gNi/m$^2$.

Finally, electrode structures produced by this method (i.e. with slurry overcoating the plated structure) have rougher surfaces and larger surface areas and therefore should exhibit better electrode performance due to improved contact with the active mass.

Some degree of nickel density variation can also be achieved during the carbonyl plating process by varying the intensity of the infrared lamps as required either across the width of the strip or periodically along the length in order to vary the rate of plating.

A number of experimental trials were run to determine the efficacy of the invention.

EXAMPLE 1

Slurries were prepared by mixing Type 110 nickel powder with water, a suitable dispersant and a wetting agent. One dispersant which was found to be particularly effective is Rika-Bond™ SA-20, which is a copolymer of acrylic ester and acrylic acid, available from the Chuo-Rika company in Japan. A wetting agent, L.O.C.™, available from Amway Corporation was successfully employed. Atypical slurry consisted of a mixture of the Type 110 nickel powder, about 10% (by weight) aqueous solution of Rika-Bond, and L.O.C in the approximate ratio 100/25/0.5 by weight. Slurry parameters, such as the powder/dispersant solution weight ratio for example, can be altered to help control the density of nickel coated on the foam.

A commercial spray gun was used to apply the slurry as a dense 2.5 cm wide stripe down the center of a 28 cm wide piece of unsintered foam which had initially been nickel tetracarbonyl plated to a density of ~550 gNi/m$^2$. Adjustments to the conditions of the spraying can also be used to help control the density of the nickel coated on the foam. After drying, the foam was sintered at about 1000° C. to burn out the polyurethane from the raw foam and the organic from the sprayed-on mixture, leaving a strong strip of porous Ni foam with a high-density stripe of nickel on the central axis. The density of the coated region was ~2300 g/Ni/m$^2$ (i.e. about four times that of as-plated foam).

In the test described here, two symmetrical electrodes ~12 cm high were cut from the 28 cm wide foam strip. In addition, the relative orientation of the two electrodes was such that they were cut out with an additional 2.5 cm high tab made with material from the central area of the strip with the higher nickel density.

Depending on the dimensions of the desired electrodes, the high density stripe could be located at a different location on the strip width, or multiple stripes could be applied. For example, applying the coating as two 1 cm wide stripes, each located 7 cm in from the edges of the 28 cm wide strip, allows the cutting out of four symmetrical electrodes, each ~6.5 cm high, with an additional 1 cm high tab made with material from the areas of higher Ni density.

EXAMPLE 2

A slurry similar to that of Example 1, consisting of a mixture of the Type 110 Ni powder, about 10% (by weight) aqueous solution of Rika-Bond, and L.O.C. in the approximate ratio 100/58/0.58 by weight, was coated on a piece of foam which had initially been plated to a relatively low density (i.e. ~200 gNi/m$^2$). The coating was carried out by dipping the foam into a bath of the slurry and blowing off any excess slurry with an air spray as the foam was taken out of the bath. In this way, the open nature of the foam could be preserved.

After drying and sintering as in the example above, a sintered foam with a density of ~700 gNi/m$^2$, was obtained. As above, the final density was a function of the slurry parameters and the conditions of the coating.

EXAMPLE 3

A similar slurry was coated on a piece of polyurethane foam and dried, giving a density of ~800 gNi/m$^2$, and sintered under the same conditions as above. The pre-coated foam was then plated with nickel to an overall density of ~300 gNi/m$^2$. The sample produced in this manner had poor mechanical strength. This example shows the reversal of steps results in a poor product.

EXAMPLE 4

A thin layer of a slurry similar to that of Example 1, consisting of a mixture of the Type 110 Ni powder, about 10% (by weight) aqueous solution of Rika-Bond, and L.O.C. in the approximate ratio 100/175/1.2 by weight, was applied to a piece of plated but unsintered foam with an initial density of ~530 gNi/m$^2$, so that after sintering under the normal conditions, a rough surface was obtained. This would improve the contact between the active mass and the current collector. The applied coating resulted in an increase in the density by ~50 g/Ni/m$^2$, to a final density of ~580 gNi/m$^2$.

EXAMPLE 5

In a manner similar to that described in the above Example 1, a slurry was applied to a 23 cm wide strip of plated but unsintered felt as a dense 2.5 cm wide stripe down the central axis by spraying with a commercial spray gun. The felt had initially been plated to a density of ~350 gNi/m$^2$. The slurry consisted of a mixture of the Type 110 Ni powder, about 10% (by weight) aqueous solution of Rika-Bond, and L.O.C, in the approximate ratio 100/33/0.5 by weight. After drying, the material was sintered at 1000° C., leaving a porous Ni felt with a narrow high-density area on the central axis. The density of the coated region was ~1870 gNi/m$^2$ (i.e. about five times that of the as-plated felt).

As described in Example 1, the location(s) of the dense stripe(s) can be changed, depending on the desired sizes of the electrodes. The dense stripes could be further physically compressed increasing the density even further. Compressed sites would be useful for electrode tabs.

In summary, an object of the present invention is an efficient method for manufacturing a continuous strip of porous substrate which could be pasted and stamped into electrodes which have increased density and conductivity in the areas of high current (i.e. specifically in the tab area). A high nickel density in the tab area simplifies the welding of solid metal tabs and improves the strength and conductivity of the weld, or optionally permits the forming of the whole tab from the porous structure by simple compression of the high density area. This simplifies the electrode manufacturing process as well as produces electrodes with a superior performance.

While in accordance with the provisions of the statute, there are illustrated and described herein specific embodiments of the invention, those skilled in the art will understand that changes may be made in the form of the invention covered by the claims and that certain features of the invention may sometimes be used to advantage without a corresponding use of the other features.

The embodiments of the invention in which an exclusive property or privilege is claimed are defined as follow:

1. A process for varying the density of a plated porous substrate, the process consisting essentially of:
   a) providing an initial plated porous substrate;
   b) forming a metal powder slurry;
   c) coating the initial plated porous substrate with the metal powder slurry;
   d) drying the coated substrate;
   e) sintering the coated substrate; and
   f) creating the finished coated substrate.

2. The process according to claim 1 wherein the metal powder is nickel.

3. The process according to claim 1 wherein the metal powder has a particle size of about 1 μm or less and an apparent density of about 1 g/cc or more.

4. The process according to claim 1 wherein the metal powder is dispersed in water, a dispersant and a wetting agent.

5. The process according to claim 4 including a slurry comprising the metal powder, about 10% (by weight) aqueous solution of the dispersant and the wetting agent in the ratio of about 100/25-175/0.5-1.2.

6. The process according to claim 1 including sintering the coated substrate at about 1000° C.

7. The process according to claim 1 wherein the density of the finished coated substrate is greater than the initial plated porous substrate.

8. The process according to claim 7 wherein the density of the finished coated substrate is up to about five times greater than the initial plated porous substrate.

9. The process according to claim 1 wherein the density of the initial plated porous substrate is about 100–300 grams metal/m$^2$.

10. The process according to claim 1 wherein the coating is selectively deposited on the initial porous metal substrate varying the density of the coated substrate.

11. The process according to claim 1 wherein the plated porous substrate is plated by the decomposition of metal carbonyl to form the initial plated porous substrate.

12. The process according to claim 11 wherein the metal carbonyl is nickel tetracarbonyl.

13. The process according to claim 1 wherein the finished coated substrate is compressed at a predetermined location.

14. The process according to claim 1 wherein the finished coated substrate is impregnated with active mass for use in a battery.

15. The process according to claim 1 wherein a porous substrate is selected from the group consisting of foam or felt.

16. The process according to claim 15 wherein a porous substrate is polymeric.

17. The process according to claim 1 including spraying the initial plated porous substrate with the slurry.

18. The process according to claim 1 including dipping the initial plated porous substrate in the slurry.

* * * * *